UNITED STATES PATENT OFFICE.

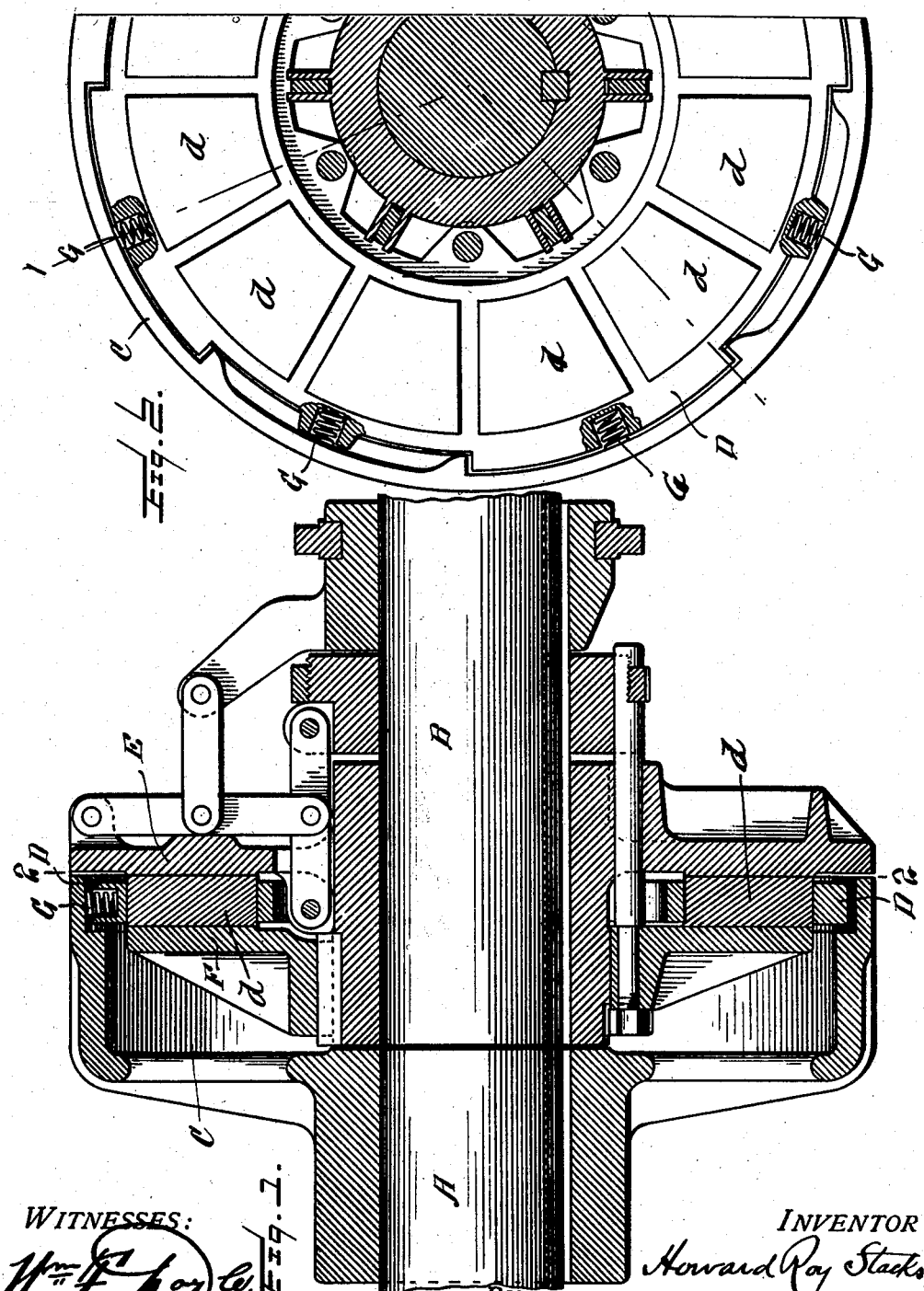

HOWARD ROY STACKS, OF PHILADELPHIA, PENNSYLVANIA, ASSIGNOR TO GEO. V. CRESSON CO., OF PHILADELPHIA, PENNSYLVANIA.

FRICTION-CLUTCH.

No. 924,397.  Specification of Letters Patent.  Patented June 8, 1909.

Application filed January 21, 1909. Serial No. 473,451.

*To all whom it may concern:*

Be it known that I, HOWARD ROY STACKS, of Philadelphia, in the county of Philadelphia, and in the State of Pennsylvania, have invented a certain new and useful Improvement in Friction-Clutches, and do hereby declare that the following is a full, clear, and exact description thereof.

In clutches of the type which form the subject of Patents No. 835,373, November 6, 1906, and No. 890,810, June 16, 1908, to Geo. V. Cresson Co., as my assignee, experience has shown that in large sized clutches particularly, the employment of V grooves and projections on the friction blocks and clamping jaws is undesirable. When the shafts to be coupled together are not in perfect alinement, the V grooves of the friction blocks and the complementary projections of the jaws or clamping rings are of course out of alinement, and they are also out of alinement from the dropping of the block-carrying ring. In such cases it sometimes happens, by reason of the weight of the friction block-carrying ring or float, that the engagement of the V-shaped projections with the V-shaped grooves does not act to cause enough lateral shifting of the friction block-carrying ring or float to produce accurate or proper contact of projections and grooves so that instead of extended surfaces in contact, there may be but points of contact, and therefore an insufficient grip or bearing of the clutching surfaces. The object of my present invention is to overcome this difficulty.

In the accompanying drawings, Figure 1 is a longitudinal section of a clutch embodying my invention; and Fig. 2 is a section on the line 2—2 of Fig. 1.

As in the case of the clutch illustrated in the patents before mentioned, the clutch in which I have embodied my present invention is applied to two shaft sections A and B, to one of which sections is attached a cup-formed shell or case C, within which is the friction block-carrying ring or float D that is connected with the shell or case, so that the two will rotate together, the connection between them being a loose one that permits movement of the ring or float D in a radial or sidewise direction, and there are two clamping rings or jaws E and F on opposite sides of the ring or float D, and there is a toggle mechanism, which need not be described, by which the clutching and unclutching operations may be performed, said clamping jaws being mounted upon the shaft section B. At several points around its circumference or periphery, small helical or coil springs G are interposed between the ring or float D and the rim of the shell or case C, said springs being radially disposed and acting together to yieldingly hold the friction block-carrying ring or float D concentric with the shaft section A. Of course the number of springs G employed will be such that no matter at what point in the revolution of the clutch it comes to rest, the ring or float D will be supported or held from radial movement by dropping when it is unclutched. It will be seen that although normally maintained in a position concentric with the shaft section A, yet when the clamping rings E and F are locked or made to clamp the friction blocks *d* in a clutching operation, the friction ring D is free to move or shift radially or laterally if there be want of alinement between the shaft sections A and B, the ring or float-supporting springs being compressed or expanded as may be required, and the ring or float moving radially or laterally to the extent that the clearance between it and the rim of the shell or case C will permit.

It will be evident that without the use of the springs when the friction ring or float D is stationary or not revolving, it will by reason of the clearance between it and the rim of the shell or case C, drop out of alinement with the shaft section A and rest on the bottom portion of the rim of the shell or case C. The advantage therefore of maintaining the ring or float D normally but yieldingly in a concentric position will be perceived, and in some cases this arrangement is useful when the V-shaped grooves and projections on jaws and friction ring are employed, but ordinarily I prefer to dispense with the V-shaped grooves or projections and make the abutting surfaces of friction blocks and jaws plane surfaces, as there are certain advantages in operation, and cost of manufacture, that are thereby secured, and these are advantages which are obtained by yieldingly supporting the friction ring or float D in a concentric position with its shaft section A. The plane surfaces are cheaper because the cost of machining is less, and they are not open to the objection of an inadequate contact of the friction surfaces, which is apt to be the case where V-shaped abutting surfaces are employed, inasmuch as because of want of proper alinement of the projections and grooves the whole of the surfaces intended to abut do not abut.

Having thus described my invention, what I claim is—

1. In a clutch, the combination of a shaft-carrying shell or case, a friction member loosely connected therewith so as to be free to move radially, means yieldingly holding said member from radial movement in all points occupied by it in its rotary movement, and while it is in unclutched position, and a coöperating clutch member movable into and out of engagement with said first-mentioned friction member.

2. In a clutch, the combination of a shaft-carrying shell or case, a friction member loosely connected therewith so as to be free to move radially, means yieldingly holding said member from radial movement in all points occupied by it in its rotary movement, and while it is in unclutched position, and jaws on opposite sides of said member.

3. In a clutch, the combination of a shaft-carrying shell or case, a friction member loosely connected therewith so as to be free to move radially, radially arranged springs interposed between said shell or case and said member yieldingly holding said member from radial movement in all points occupied by it in its rotary movement, and while it is in unclutched position, and a coöperating clutch member movable into and out of engagement with said first-mentioned friction member.

4. In a clutch, the combination of a shell or case, a friction ring within and loosely connected with the same, the connection permitting radial movement of the ring, springs interposed between said ring and said case or shell in all points occupied by it in its rotary movement, and while it is in unclutched position, yieldingly holding the ring concentric with the case or shell, and a clutch member to frictionally engage said ring.

5. In a clutch, the combination of a case or shell, a friction block-carrying ring rotatably connected with said case or shell, and mounted for radial movement therein, springs interposed between the shell and the ring yieldingly holding the ring concentric with the shell in all points occupied by it in its rotary movement, and while it is in unclutched position, and clamping jaws for engaging the friction blocks, the engaging surfaces of jaws and blocks being plane.

In testimony that I claim the foregoing I have hereunto set my hand.

HOWARD ROY STACKS.

Witnesses:
WM. A. PEFFLE,
JOSEPH M. HEWLETT.